(12) United States Patent
Schuffenhauer et al.

(10) Patent No.: US 9,827,619 B2
(45) Date of Patent: Nov. 28, 2017

(54) MACHINING TOOL AND CUTTING HEAD FOR THE MACHINING TOOL

(75) Inventors: Michael Schuffenhauer, Furth (DE); Rene Xylander, Oberstadt (DE)

(73) Assignee: KENNAMETAL INC., Latrobe, PA (US)

( * ) Notice: Subject to any disclaimer, the term of this patent is extended or adjusted under 35 U.S.C. 154(b) by 433 days.

(21) Appl. No.: 13/521,842

(22) PCT Filed: Jan. 13, 2011

(86) PCT No.: PCT/EP2011/000109
§ 371 (c)(1),
(2), (4) Date: Nov. 7, 2012

(87) PCT Pub. No.: WO2011/085978
PCT Pub. Date: Jul. 21, 2011

(65) Prior Publication Data
US 2013/0051935 A1    Feb. 28, 2013

(30) Foreign Application Priority Data
Jan. 14, 2010  (DE) .................. 10 2010 004 526

(51) Int. Cl.
*B23C 5/10* (2006.01)
*B23B 31/11* (2006.01)

(52) U.S. Cl.
CPC ............ *B23C 5/10* (2013.01); *B23B 31/1107* (2013.01); *B23B 31/1122* (2013.01); *B23C 2210/02* (2013.01); *B23C 2210/03* (2013.01); *Y10T 407/19* (2015.01); *Y10T 407/1906* (2015.01); *Y10T 407/1908* (2015.01); *Y10T 407/1946* (2015.01); *Y10T 408/907* (2015.01)

(58) Field of Classification Search
CPC ............... B23B 31/008; B23B 31/1107; B23B 31/1122; B23C 5/10; B23C 2210/02; B23C 2210/03
USPC ............................................. 407/34, 54, 119
See application file for complete search history.

(56) References Cited

U.S. PATENT DOCUMENTS

| 1,354,097 | A | * | 9/1920 | Fitzsimmons | .................. 407/53 |
| 1,407,335 | A | * | 2/1922 | Reynolds | ............ B23B 31/1107 279/100 |
| 3,586,353 | A | * | 6/1971 | Lorenz | .................... F16B 33/02 285/334 |

(Continued)

FOREIGN PATENT DOCUMENTS

| CN | 1416989 A | 5/2003 |
| CN | 1468678 A | 1/2004 |

(Continued)

*Primary Examiner* — Will Fridie, Jr.
(74) *Attorney, Agent, or Firm* — Matthew S. Bedsole

(57) ABSTRACT

A machining tool includes a holder and a cutting head which can be screwed into the holder. The cutting head includes a cutting-edge region and a coupling region. The coupling region includes a flat contact area facing the holder, a cylindrical thread carrier with an external thread adjoining the flat contact area, and a clamping cone adjoining the thread carrier. The holder includes a planar counter-contact area disposed adjacent the flat contact area of the coupling region, a cylindrical internal thread adjoining the planar counter-contact area, and a hollow-conical cone contact area next to the internal thread.

7 Claims, 2 Drawing Sheets

(56) References Cited

U.S. PATENT DOCUMENTS

| | | | | |
|---|---|---|---|---|
| 5,114,286 A | * | 5/1992 | Calkins | B23B 31/11 408/226 |
| 5,496,137 A | * | 3/1996 | Ochayon | B22F 5/06 408/226 |
| 5,971,670 A | * | 10/1999 | Pantzar | B23B 31/1107 407/119 |
| 6,012,881 A | * | 1/2000 | Scheer | 408/227 |
| 6,273,650 B1 | * | 8/2001 | Jordberg | B23B 27/007 407/102 |
| 6,402,605 B1 | * | 6/2002 | Christiansen et al. | 451/540 |
| 6,494,648 B2 | * | 12/2002 | Harpaz | B23B 31/11 407/30 |
| 6,499,919 B2 | * | 12/2002 | Feld | B23B 51/00 408/213 |
| 7,374,376 B2 | * | 5/2008 | Jonsson | B23B 31/1107 279/8 |
| 7,611,311 B2 | * | 11/2009 | Kakai | B23B 31/1107 279/8 |
| 8,662,800 B2 | * | 3/2014 | Guay | B23C 5/10 279/8 |
| 8,939,685 B2 | * | 1/2015 | Cigni | B23C 5/10 407/11 |
| 2009/0184479 A1 | | 7/2009 | Guy | |

FOREIGN PATENT DOCUMENTS

| | | |
|---|---|---|
| CN | 101027156 A | 8/2007 |
| DE | 10114240 A1 | 1/2003 |
| EP | 1 112 813 A2 | 7/2001 |
| EP | 2 008 744 A2 | 12/2008 |
| WO | 02/076661 A1 | 10/2002 |

* cited by examiner

MACHINING TOOL AND CUTTING HEAD FOR THE MACHINING TOOL

BACKGROUND OF THE INVENTION

The invention relates to a machining tool with a holder and with a cutting head which can be screwed into the holder and relates to such a cutting head. The cutting head for its part comprises a cutting-edge region and a coupling region. Such a cutting head that can be screwed into a holder is known, for example, from U.S. 2001/0041089 A1.

On account of the present-day precision production methods for cutting tools, in particular cutting heads, it is possible to produce a cutting head without laborious finishing operations, in particular grinding work on the cutting-edge region, being required at the end of the production process. For reasons of cost, it is desired on the one hand to dispense with clamping aids, for example clamping pins, in the coupling region, and on the other hand to complete the cutting tool without having to carry out remachining in the coupling region of the cutting head to make it fit into the holder.

The periodical "NZ-Fertigung", issue 5, year 2009, discloses in the "Sonderteil Tools" [special tools supplement] a tool from the Walter company with a milling cutter referred to as "ConeFit", in which the cutter head is clamped in the cutter head holder with the aid of a conical thread and an adjoining continuation. A disadvantage of this tool is the introduction of forces. On account of the conical form of the thread, the latter tends to keep tightening itself during the milling machining and thereby increase the forces acting in the screwed coupling.

OBJECT OF THE INVENTION

The invention is therefore based on the object of simplifying the structural design of a machining tool mentioned at the beginning and improving it, particularly in its coupling region, such that it can be fitted easily and without aids in the holder and at the same time lies securely and centered in the holder.

Solution Achieving the Object

This object is achieved in an inventive way by the combination of features of the present claims. Some of the dependent claims relate to advantageous developments and some to independently inventive developments of the invention. The advantages and preferred configurations that are presented with regard to the independent claims(s) can also be transferred analogously to each of the other claims.

According to the present claims, the coupling region on the cutting head is divided into three regions. Firstly, a flat contact area is provided adjacent the cutting-edge region, and the flat contact area is adjoined in the axial direction by a cylindrical thread carrier with an external thread. The thread carrier is in turn adjoined in the axial direction by a clamping cone. The holder has on its end face a planar counter-contact area, against which the flat contact area firmly lies when the cutting head is screwed in. In the holder, the counter-contact area is adjoined by a hollow-cylindrical region with an internal thread. The external thread can be screwed into the internal thread for fixing the cutting head on the holder. Finally, the holder has next to the internal thread in the axial direction a hollow-conical cone contact area. The clamping cone of the cutting head lies against this cone contact area when the cutting head is screwed into the holder, and spreads the holder apart in the region of this cone contact area.

An advantage of this configuration is the separation of the introduction of force for providing the clamping force through the cylindrical thread and the flat contact area on the one hand and the centering and guiding of the cutting head in the holder by the clamping cone and the cone contact area on the other hand.

By contrast with the prior art described at the beginning, the external thread of the cutting head interacting with the internal thread of the holder exclusively has the function of bracing the flat contact area of the cutting head against the counter area on the holder. The cylindrical thread improves the force transmission here between the cutting head and the holder. The centering accuracy of the clamping cone and of the hollow-conical cone contact area expanded by the clamping cone is very high. Moreover, the possibility of the hollow-conical cone contact area expanding in the holder at the same time reduces the wear of the internal thread and the external thread.

A further advantage is the complete elimination of clamping aids. Because of this elimination of clamping aids and the favorable force transmission via the external and internal threads, the coupling region of the cutting head requires only a very small installation space in the holder, and is consequently specifically suitable for cutting heads with very small shanks. In a preferred configuration, the cutting-edge region is adjoined in the axial direction by a flat collar. The peripheral region of its end face facing away from the cutting-edge region is configured here as a flat contact area. Seen in the axial direction, projecting from the center of the end face of the flat collar there is firstly the cylindrical thread carrier with the external thread and then the clamping cone.

The axial length of the external thread in a preferred configuration is a maximum of 50% of the length of the cone. This means that the axial length of the thread is less than or equal to half the axial length of the clamping cone. This configuration for its part contributes in turn to the spatial economy of the tool in the coupling region.

Altogether, the clamping cone is of a comparatively long form in the axial direction and has in particular an only small cone angle in the range of a few degrees, preferably in the range of a maximum of 2°. In other words, the cone lateral surface is inclined with respect to the longitudinal axis at the cone angle.

The length of the clamping cone preferably lies approximately in the range of its (greatest) diameter in the region of the cone base.

One effect of the comparatively great length of the clamping cone, in particular in combination with the small cone angle, is that easy insertion of the coupling region into the holder and exact centering in the holder are made possible.

The invention is particularly suitable for a cutting head consisting entirely of hard metal or a cutting head with a cutting-edge region consisting of hard metal and a coupling region consisting of steel. The invention is also suitable for cutting heads with applied, preferably soldered-on, hard-metal cutting edges.

On account of the functional separation of the introduction of force through the thread in the coupling region on the one hand and the guiding and centering of the cutting head in the holder by the clamping cone and the cone contact area on the other hand, it is possible to adapt the internal thread and the external thread individually for different types of cutting head. In an advantageous configuration for a machining tool formed as a reaming tool with reaming cutting edges in the cutting-edge region, both the external thread and the internal thread, formed complementarily thereto, are respectively formed as a fine thread. This type of thread has a greater number of thread turns than a coarse thread, so that a higher screwing force can be introduced into the screwed connection over the same axial thread length.

In adaptation to a machining tool formed as a milling tool, the external thread and the internal thread, formed complementarily thereto, are preferably configured as a coarse thread. This is so because the coarse thread has the advantage over the fine thread that it has much less of a tendency to tighten itself during the machining operation, and consequently increase of its own accord the forces acting in the screwed coupling.

The use of a coarse thread has the advantage that the cutting head can be clamped much more quickly in the holder, and over-tight bracing caused by machining forces of the cutting head in the holder is avoided. The use of a fine thread makes it possible that the screwed coupling can be set very much more smoothly and consequently more precisely.

In other words, with the invention it is possible very well to adapt the screwed coupling that is effective between the cutting head and the holder optimally to the respective application, that is to say to the respective machining process, while at the same time maintaining the guiding and centering by the centering cone on the cutting head and the cone contact area on the holder.

DESCRIPTION OF THE EXEMPLARY EMBODIMENT

Figure 1:
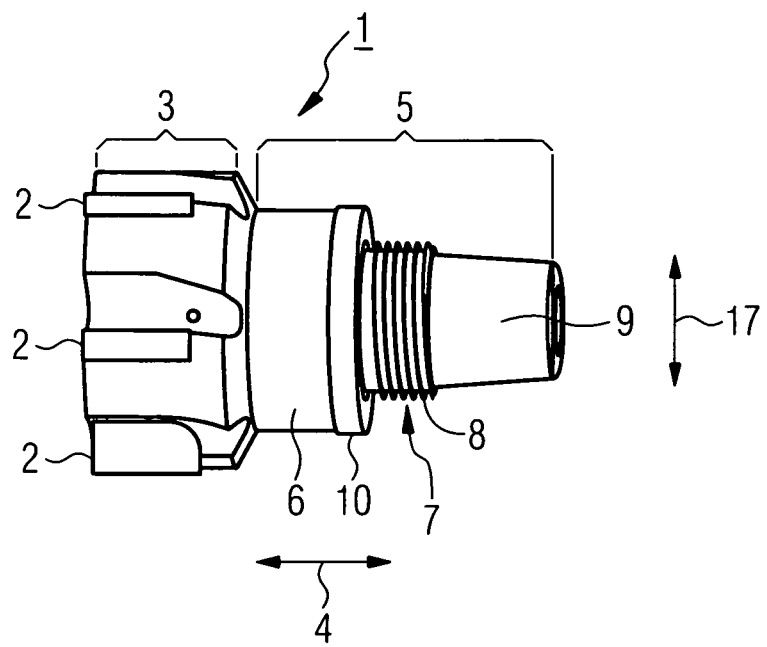
FIG. 1 shows a side view of the cutting head according to the invention.

The cutting head 1 consists of a cutting-edge region 3, bearing a number of cutting edges 2, and of a coupling region 5, adjoining the cutting-edge region 3 in the axial direction 4.

The coupling region 5 is for its part made up of the flat collar 6, the cylindrical thread carrier 7 and the clamping cone 9. The flat collar 6 in this case adjoins the cutting-edge region 3 in the axial direction 4. Projecting in the axial direction 4 from the end face of the flat collar 6 that is facing away from the cutting-edge region 3 in the axial direction 4 there is the cylindrical thread carrier 7. Formed into the outer lateral surface of the thread carrier 7 is the external thread 8. The thread carrier 7 is in turn adjoined in the axial direction 4 by the clamping cone 9. The outer periphery of the end face of the flat collar 6 that is facing away from the cutting-edge region 3 forms the flat contact area 10. The flat contact area 10 consequently runs in the manner of a ring around the thread carrier 7 projecting in the axial direction 4 from the end face of the flat collar 6 that is facing away from the cutting-edge region 3. In the case of the configuration according to FIG. 1, the flat collar 6 has a greater axial length in comparison with the configuration according to FIG. 3, in order for example to provide an engaging area for an assembly tool. In the case of the configuration according to FIG. 1, the fastening is performed with the aid of a hexagon socket arranged on the end face.

Figure 2:
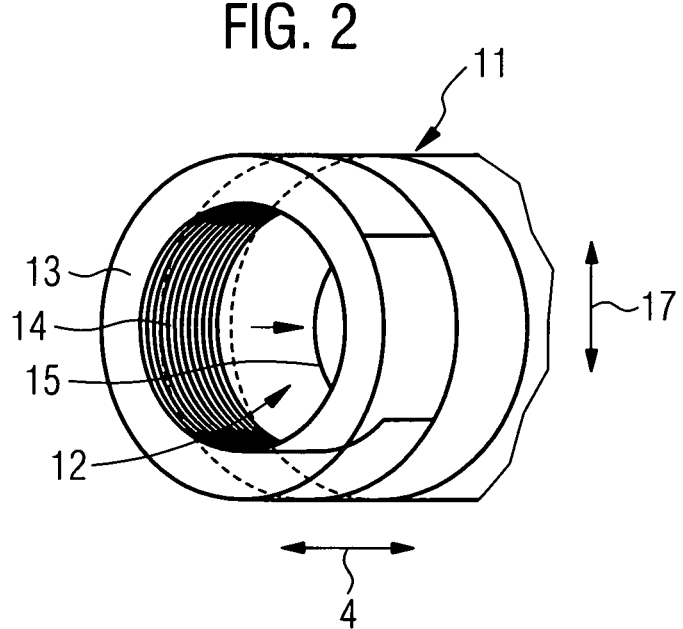
FIG. 2 shows a perspective view of the end of the holder that is facing the cutting head and FIG. 3 shows a sectioned side view of the cutting head screwed into the holder.
Figure 3:
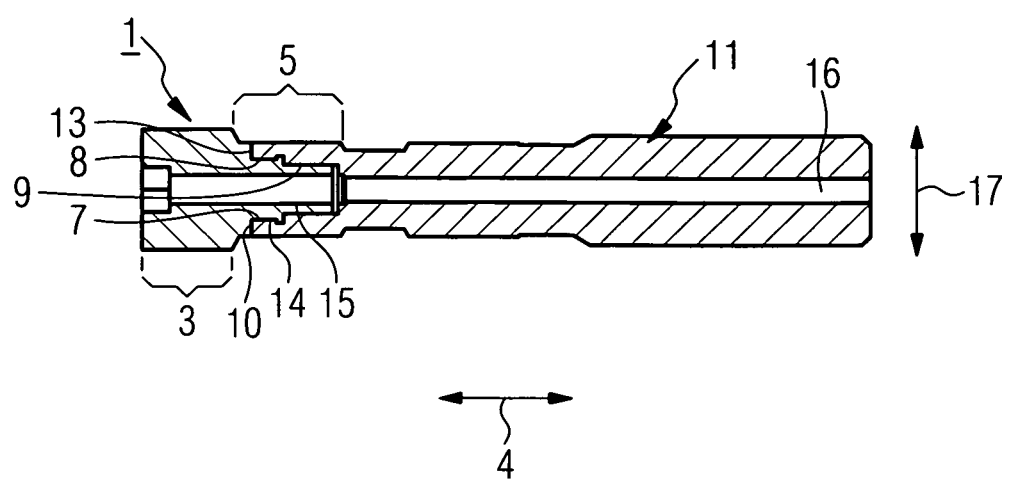

The holder, the end side of which is represented in FIG. 2, has a receiving opening 12 for the coupling region 5 of the cutting head 1. The opening rim of the receiving opening 12 is in this case formed as a counter-contact area 13 for the flat contact area 10 in the final state of assembly. In the axial direction 4, the counter-contact area 13 is adjoined by the internal thread 14 of the holder 11. The internal thread 14 is respectively formed complementarily to the external thread 8 of the cutting head 1 to be screwed into the respective holder 11. The internal thread 14 is finally adjoined in the holder 11 by the hollow-conical cone contact area 15. The cone contact area 15 serves as a contact area for the clamping cone in the final state of assembly, which is represented in FIG. 3. In FIG. 3, the holder 11 and the cutting head 1 screwed into the holder 11 can be seen. In the axial direction 4, the holder 11 and the cutting head 1 are passed through by the coolant/lubricant bore 16.

In the final state of assembly, the external thread 8 is screwed so far into the internal thread 14 that the flat collar 6 of the cutting head lies firmly against the counter-contact area 13 of the holder. The external thread 8, the internal thread 14, the flat contact area 10 and the counter-contact area 13 thereby introduce the screwing force into the screwed coupling that is effective between the holder 11 and the cutting head 1.

On the other hand, the guiding of the cutting head 1 in the holder 11 during the screwing-in operation and the centering of the cutting head 1 with respect to the holder 11 are brought about by the clamping cone 9 together with the cone contact area 15. For this, the clamping cone 9 lies embedded in the cone contact area 15 enclosing it as it were. As a result of the screwing force introduced through the screwed coupling described above, the clamping cone 9 spreads the cone contact area 15 so far apart in the holder 11 that the cutting head 1 is aligned such that it is centered with respect to the holder 11 in all directions, that is to say in the axial direction 4 and in the radial direction 17 running perpendicularly to the axial direction 4.

The invention claimed is:

1. A machining tool comprising:
   a holder; and
   a cutting head which can be screwed into the holder, the cutting head having a cutting edge region and a coupling region,
   wherein the coupling region comprises:
      a flat contact area facing the holder,
      a cylindrical thread carrier with an external thread, the cylindrical thread carrier directly contacting the flat contact area, and
      a clamping cone directly contacting the thread carrier;
   wherein the holder comprises:
      a planar counter-contact area disposed adjacent the flat contact area of the coupling region,
      a cylindrical internal thread directly contacting the planar counter-contact area, and
      a hollow-conical cone contact area directly contacting the internal thread; and
   wherein the clamping cone of the cutting head is adapted to lie against the hollow-conical cone contact area when the cutting head is screwed into the holder to spread the holder apart in the region of the hollow-conical cone contact area.

2. The machining tool of claim 1 wherein the cutting head further comprises a flat collar adjacent the cutting-edge region and having the flat contact area on an end face that is facing away from the cutting-edge region.

3. The machining tool of claim 1 wherein the external thread has an axial length which corresponds at a maximum to half the axial length of the clamping cone.

4. The machining tool of claim 1 wherein the cutting head is formed of hard metal.

5. The machining tool of claim 1 wherein the cutting head comprises a plurality of soldered-on hard-metal cutting edges.

6. The machining tool of claim 1 wherein the tool is formed as a reaming tool with reaming cutting edges, respectively having a fine thread as the external thread on the cutting head and as the internal thread on the holder.

7. The machining tool of claim 1 wherein the tool is formed as a milling tool with milling cutting edges, respectively having a course thread as the external thread on the cutting head and as the internal thread on the holder.

* * * * *